Feb. 4, 1947. C. G. STRANDLUND 2,415,224

WHEEL MOUNTING

Original Filed June 17, 1940

INVENTOR.
CARL G. STRANDLUND

ATTORNEYS

Patented Feb. 4, 1947

2,415,224

UNITED STATES PATENT OFFICE 2,415,224

WHEEL MOUNTING

Carl G. Strandlund, Moline, Ill., assignor to Deere & Company, Moline, Ill., a corporation of Illinois Original application June 17, 1940, Serial No. 340,925. Divided and this application February 7, 1944, Serial No. 521,482

17 Claims. (Cl. 287—53)

1

This application is a division of my co-pending U. S. application, Serial No. 340,925, filed June 17, 1940.

The present invention relates generally to agricultural implements and more particularly to power lift clutches by which a constantly rotatable part is operatively connected with an intermittently driven part for effecting some adjustment of the implement, such as raising or lowering the tool or tools into and out of the ground. Clutch mechanism of this general type is disclosed in my prior Patents Nos. 2,119,757 and 2,156,362, issued June 7, 1938, and May 2, 1939, respectively.

The object and general nature of this invention is the provision of new and improved means for securing the driving ground wheel to the driving member of a lifting clutch of the enclosed type, particularly a clutch of the type having a casing part that in assembly is passed into position over external parts with respect to which the clutch casing is to be disposed in sealed or lubricant-tight relation. More particularly, it is a feature of this invention to provide new and improved means for fastening the wheel of an agricultural machine onto a spindle or axle by means which is engageable with the spindle or axle at points generally radially inwardly of the outer surface of such wheel or axle, especially with respect to the surface thereof which receives the enclosure or casing part in sealing or lubricant-tight relation. Thus, the provision of the detachable wheel mounting means does not in any way interfere with the convenient and simple assembly of the enclosing casing part into sealing engagement with the wheel-receiving part.

These and other objects and advantages of the present invention will be apparent to those skilled in the art after a consideration of the following detailed description, taken in conjunction with the accompanying drawing illustrating the preferred form in which the principles of the present invention have been incorporated.

Figure 1:
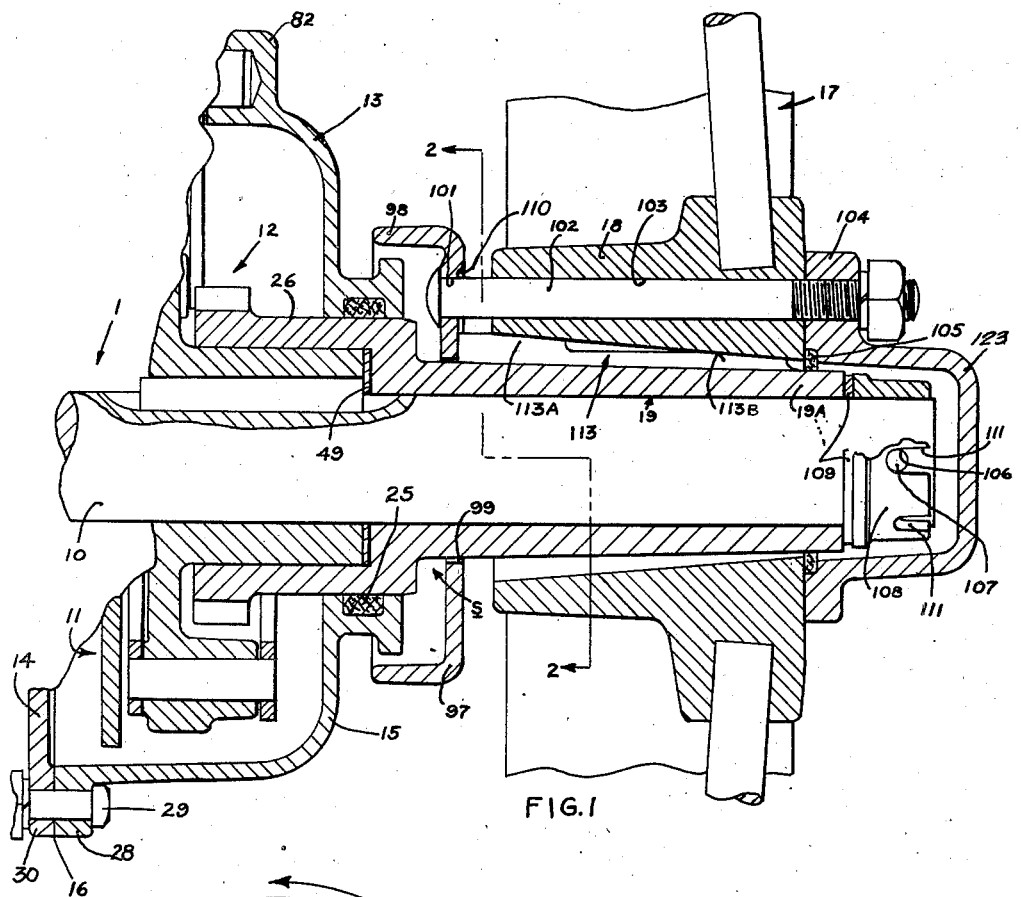
Figure 1 is a sectional view showing the wheel clamping means and its relation to the portion of the wheel-receiving part that also receives the casing part in sealing engagement.

Referring now to the drawing, particularly to Figure 1, the reference numeral 1 indicates the swinging crank axle of a tractor plow, such as one

2 of the type shown in my prior patents mentioned above. The crank axle 1 extends downwardly and forwardly with respect to the plow frame and is provided at its lower end with a transverse land wheel axle 10 rotatable with respect to the swinging crank axle as a whole and carrying at one end (not shown) a crank which forms a part of the lifting mechanism. This mechanism also includes a clutch of the self-interrupting type, indicated in its entirety by the reference numeral 11 and which, in turn, includes interior mechanism 12 and an enclosing casing 13. The casing 13 includes a pair of casing parts 14 and 15. These casing parts are so arranged that the casing 13 may be considered as split along a line or plane 16 that is perpendicular with respect to the axis of the axle 10. Preferably, the casing section 14 forms a part of a supporting sleeve or the like in which the axle 10 is journaled for rotation, the sleeve just mentioned in turn, forming a part of the swinging crank axle 1. In the assembly of the clutch mechanism it is necessary to pass the casing section 15 into position over the external portions of the clutch driving mechanism, and this gives rise to certain requirements with respect to the means for fastening the ground or driving wheel to the part that receives it and which, in turn, serves to connect with or form the driving part of the clutch mechanism 12.

The wheel clamping or mounting mechanism, especially adapted for the above mentioned purpose, will now be described.

Figure 2:
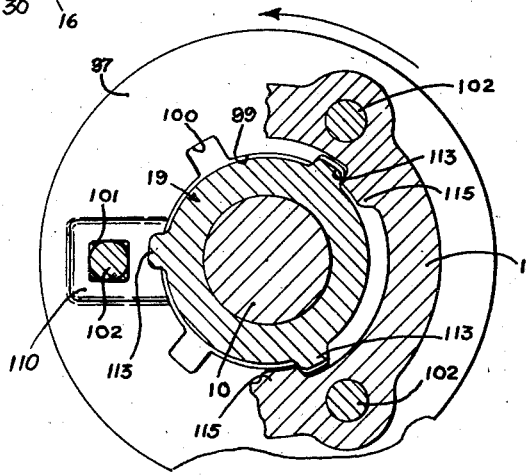
Figure 2 is a sectional view, taken generally along the line 2—2 of Figure 1, showing the manner of mounting the ground wheel in driving engagement on the driving member of the clutch that is enclosed by the casing.

The ground wheel or drive wheel is indicated in its entirety by the reference numeral 17 and is provided with a hub 18 mounted in a particular manner on a sleeve 19 that constitutes the driving member of the clutch 11. According to the present invention, both the clutch section 15 and the wheel 17 are mounted in position by applying them onto the member 19 from the same end thereof. From Figure 1 it will be noted that the laterally outer extended portion of the member 19 is indicated by the reference numeral 19A and that this extended section is provided with a plurality, preferably three, axially extending circumferentially spaced ribs 113 (Figure 2) each rib being lower in its central portion, thereby providing two axially spaced wheel hub receiving sections 113A and 113B. The extended section 19A of the member 19, and the ribs 113 as well, taper generally axially outwardly, and the interior of the wheel hub 18 is of complementary formation. Further, the hub 18 of the wheel is provided with a corresponding number of radially inwardly axially extending ribs 115 which, as best shown in Figure 2, are adapted to be disposed alongside and up against the companion rib 113. These cooperating pairs of ribs therefore form driving means between the hub 18 of the wheel 17 and the associated driving member 19 of the clutch. Also, since these parts are tapered, suitable means is provided for drawing the wheel axially into clamping engagement with the driving clutch member 19. Such means will now be described.

According to the present invention, means is provided for drawing the wheel 17 into place on the member 19, but such means is arranged so that it may be applied onto the member 19 from the same end thereof that receives the wheel 17, whereby it is not necessary to dismantle the clutch or other parts when attaching or removing the land wheel 17. A ring 97 having an axially inwardly directed flange 98 serving as a dust collar surrounding the outer flange on the part 15 of the clutch casing 13, is provided with a central opening 99 adapted to pass over the outer end of the member 19, and the opening 99 is further provided with notches 100 opening into the central opening 99 so as to receive the ribs 113 on the member 19. As best shown in Figure 1, the ribs 113 terminate short of the hub section 26 whereby there is a space s into which the ring member 97 may be moved and be free of the ribs 113 so that the ring member may then be turned angularly about the axis of the clutch, thereby interlocking, in effect, the member 97 with the member 19. The ring member 97 is also provided with a plurality of bolt holes 101 which are adapted to receive bolts 102 which extend outwardly through openings 103 in the hub 18 of the wheel 17, and surrounding each of the bolt holes is a recess or socket 119 in which the inner end of the associated rib 113 is received. This serves to center the ring 97. At the outer end of the wheel 17 a cap 123 having an apertured flange 104 is disposed over the threaded outer ends of the bolts 102. Preferably, sealing means 105 is disposed adjacent the inner end of the cap 123 and engageable with the member 19.

The casing part 15 is in the form of a bell housing and carries suitable sealing means 25 which engages the hub portion 26 of the driving clutch member 19. The casing part 15 also includes a flange 28 which is bolted, as at 29, to the peripheral section 30 of the other casing part 14. The bolts are pulled up tight so as to prevent leakage of lubricant at the joint between the two casing parts 14 and 15, and any small amount of lubricant that might leak laterally outwardly along the axle 10 between the latter and the sleeve 19 will be confined about the outer ends of the members 10 and 19 by the seal 105. By drawing up on the bolts 102 the wheel 17 will be clamped on the tapered portions of the driving clutch member 19. Also, the bolt holes 101 in the ring member 97 and the bolt holes 103 in the hub 18 of the wheel 17 are so arranged that when the ring member 97 is engaged or interlocked with the inner ends of the ribs 113, the wheel 17 is in a position in which the ribs 115 on the inside of the hub 18 thereof are disposed against one side of the associated ribs 113 on the member 19. As will be readily understood, the parts are arranged so that the ribs or lugs 113 and 115 engage one another in the driving direction, as indicated by the arrow in Figure 2.

The clutch mechanism 12 includes one or more thrust washers, one of which is indicated by the reference numeral 49 in Figure 1, and preferably these thrust or wearing washers are of hardened steel. If end play develops in the clutch parts, such play may be taken up by adjusting means at the outer end of the axle 10. An opening 106 is formed in the outer end of the axle 10 to receive a pin 107. An adjusting collar 108 is fitted over the outer end of the axle 10 and bears against the outer end of the member 19 through a wearing washer 109. The collar 108 has a plurality of stepped castellations 111 of different axial dimensions, whereby by removing the pin 107 and turning the take-up collar 108 to a different position, wear in the washers may be accommodated. When the wear in these parts becomes excessive, they may, of course, be replaced.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a detachable wheel construction, a wheel-receiving spindle, said spindle having shouldered portions facing in an axial direction, means separate from said spindle having a central opening to receive said spindle and shouldered portions and adapted thereby to be passed over said spindle, said means being shaped to provide for shifting the same into interlocking relation with the shouldered portions of said spindle, a wheel having locking engagement with said spindle, and means reacting against said separate means for securing said wheel onto said spindle.

2. Means for mounting a driving wheel on the driving member of a clutch or the like, comprising means serving as a hub of said driving member and provided with a plurality of axially directed tapered ribs terminating short of the inner end of said driving member, a ring having a central opening adapting the ring to be passed over said hub beyond the inner ends of said ribs and also having slots to receive said ribs, said ring after being passed inwardly beyond the ends of said ribs being adapted to be rotated so as to interlock the ring against the ends of said ribs, the interior of the hub of said wheel being generally conical in formation, whereby axial movement of the wheel hub relative to said ribs tightens the wheel on the driving member of said clutch, lugs on the hub of said wheel to engage the side portions of said ribs to establish driving connection between said wheel and said driving member, and means engageable with the hub of said wheel and said ring for tightening the wheel in driving relation on said ribs.

3. In a detachable wheel construction, a wheel-receiving spindle, means thereon providing shoulders having axially inwardly facing end portions, a ring adapted to be passed onto said spindle over said shoulders from the outer end of the spindle and to be turned angularly into interlocked relation with the axially inwardly facing end portions of said shoulders, a wheel having wedging engagement with said spindle, and means acting through said ring against said shoulders for wedging said wheel onto said spindle.

4. In a detachable wheel construction, a wheel-receiving spindle, means thereon providing tapered shoulders, means separate from said spindle and adapted to be engaged with said tapered shoulders, a wheel having wedging engagement with said tapered shoulders, and means reacting against said separate means for wedging said wheel onto said tapered shoulders.

5. The invention set forth in claim 4, further characterized by means on said wheel in driving engagement with said shoulders.

6. In a detachable wheel construction, a wheel-receiving spindle having means forming axially inwardly facing shoulders and tapered wheel-receiving sections, a ring adapted to be passed onto said spindle over said shoulders and to be turned angularly into interlocked relation therewith, a wheel having wedging engagement with said tapered sections, and means acting through said ring against said shoulders for wedging said wheel onto said tapered sections of the spindle.

7. In a detachable wheel construction, a wheel-receiving spindle, a ring adapted to be passed onto said spindle from the outer end thereof, a first means operative after said ring has been passed onto said spindle for mechanically interlocking said ring with said spindle to prevent axially outward displacement of the ring relative to the spindle, a wheel adapted to be mounted on said spindle, and means acting between said ring and said wheel for clamping the latter onto said spindle.

8. In a detachable wheel construction, a wheel-receiving spindle having generally axially extending ribs thereon, said ribs having axially inwardly facing end portions, a ring adapted to be passed onto said spindle and having notches so as to receive said ribs when passing the ring onto said spindle, said ring being adapted to be turned angularly to dispose portions of the ring against the inner ends of said ribs, a wheel adapted to be mounted on said spindle, and means acting between said ring and said wheel for clamping the latter on said spindle.

9. In a detachable wheel construction, a wheel-receiving spindle having generally axially extending ribs thereon, there being spaces between the axially inward ends of said ribs and the inner end of said spindle, a ring adapted to be passed onto said spindle into said spaces axially inwardly of said ribs and having notches so as to receive said ribs when passing the ring onto said spindle, said ring being adapted to be turned angularly in said spaces to dispose portions of the ring against the inner ends of said ribs, a wheel having wedging engagement with said ribs, and means acting against said ring and said wheel for clamping the latter onto said ribs.

10. The invention set forth in claim 9, further characterized by said wheel having one or more interior ribs adapted to engage the ribs on said spindle to establish driving relation between the latter and said wheel.

11. In an agricultural implement, a driving member having adjacent one end a cylindrical section and axially outwardly thereof a wheel-receiving section of reduced diameter, a casing adapted to be passed axially over said section of reduced diameter and onto said cylindrical section and into sealing engagement therewith, means forming axially inwardly facing shoulders on the inner portion of the wheel-receiving section of said driving member, a reaction member adapted to be passed onto said reduced section and to be interlocked with said axially inwardly facing shoulders, a wheel adapted to be mounted on said reduced section axially outwardly of said reaction member, and means acting between said reaction member and said wheel for holding the latter in interlocked relation with said driving member.

12. The invention set forth in claim 11, further characterized by said driving member having axially extending tapered shoulders on the reduced section thereof, the radially outer portions of said axially extending shoulders lying generally radially within the cylindrical surface containing the cylindrical section onto which said casing is passed.

13. The invention set forth in claim 11, further characterized by said driving member having axially extending tapered shoulders on the reduced section thereof, the radially outer portions of said axially extending shoulders lying generally radially within the cylindrical surface containing the cylindrical section onto which said casing is passed, and said tapered shoulders receiving said wheel in interlocking relation.

14. In a detachable wheel construction, a wheel spindle having axially extending radially outwardly disposed shoulders terminating at their inner ends short of the inner end of said wheel spindle, a ring having inner notches receiving said shoulders and adapted to be turned angularly about the axis of said spindle into interlocking relation with the axially inner ends of said shoulders on said wheel spindle, a wheel adapted to be mounted on said spindle and having shoulders adapted to engage said first mentioned shoulders in driving relation, and means operative when the shoulders on said wheel are in driving relation with the shoulders on said spindle and the ring is in interlocked relation with said spindle for clamping said wheel onto said spindle.

15. In a detachable wheel construction, a wheel spindle having axially extending radially outwardly disposed shoulders terminating at their inner ends short of the inner portion of said spindle, a ring having inner notches receiving said shoulders and adapted to be turned angularly into interlocking relation with the inner ends of the axially extending shoulders on said wheel spindle, a wheel adapted to be mounted on said spindle and having shoulders adapted to engage said first mentioned shoulders in driving relation, said ring and wheel having apertures adapted to be brought into registry when the shoulders on said wheel are against the shoulders on the spindle and the ring is in interlocked relation with the inner ends of the axially extending shoulders on said spindle, and bolt means extending into said registered apertures for clamping the wheel onto said spindle.

16. In an agricultural machine, the combination of driving and driven members, a clutch casing enclosing at least portions of said members, said casing including a part adapted to be passed over the outer end portion of one of said members, a ring adapted to be passed over the outer end portion of said one member, means on the ring and said one member for interlocking the ring with said one member after said casing part has been passed over the outer end portion of said one member, means on said ring whereby the latter is adapted to serve as a dust collar for said casing part, a wheel, and detachable means for connecting said wheel to the outer end portion of said one member at points thereon generally radially inwardly of the portion of said one member over which said casing part is passed, said detachable means reacting against said ring.

17. A coupling between a pair of members, one of which is adapted to receive the other, comprising means forming generally axially inwardly facing shouldered portions on said one member, a part having a central opening shaped to clear said shouldered portions, when said part is passed over said one member from the outer end thereof, and to interengage with said shouldered portions when shifted generally rotatably, means forming locking engagement between said members when said other member is moved axially inwardly on said one member, and means acting between said part and said other member for interlocking the latter with said one member.

CARL G. STRANDLUND.

REFERENCES CITED

The following references are of record in the file of this patent:

UNITED STATES PATENTS

| Number | Name | Date |
|---|---|---|
| 623,373 | Jerome | Apr. 18, 1899 |
| 1,166,408 | Blood | Dec. 28, 1915 |
| 15,351 | Teal | July 15, 1856 |
| 827,346 | Bubb | July 31, 1906 |